Patented July 24, 1923.

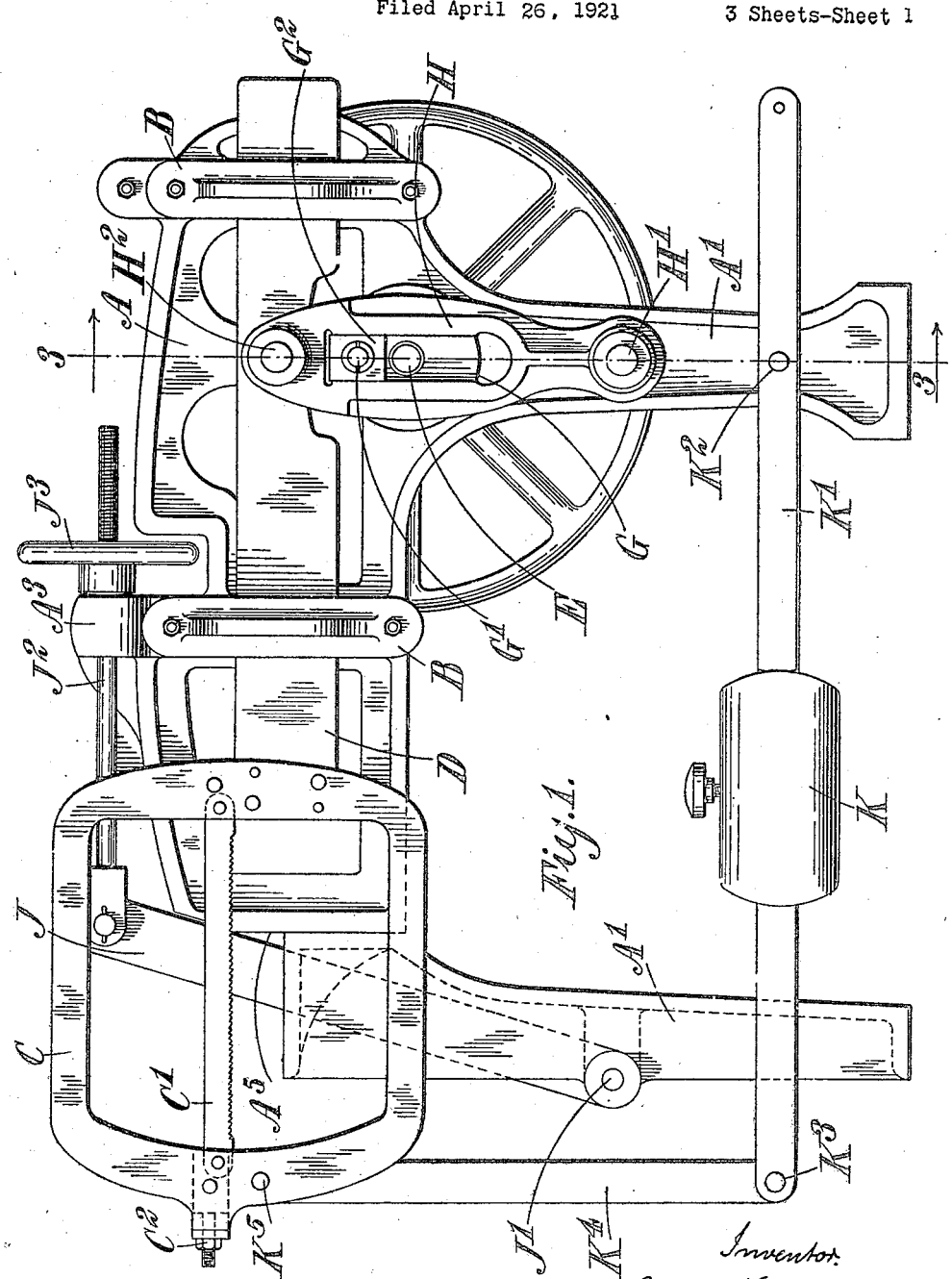

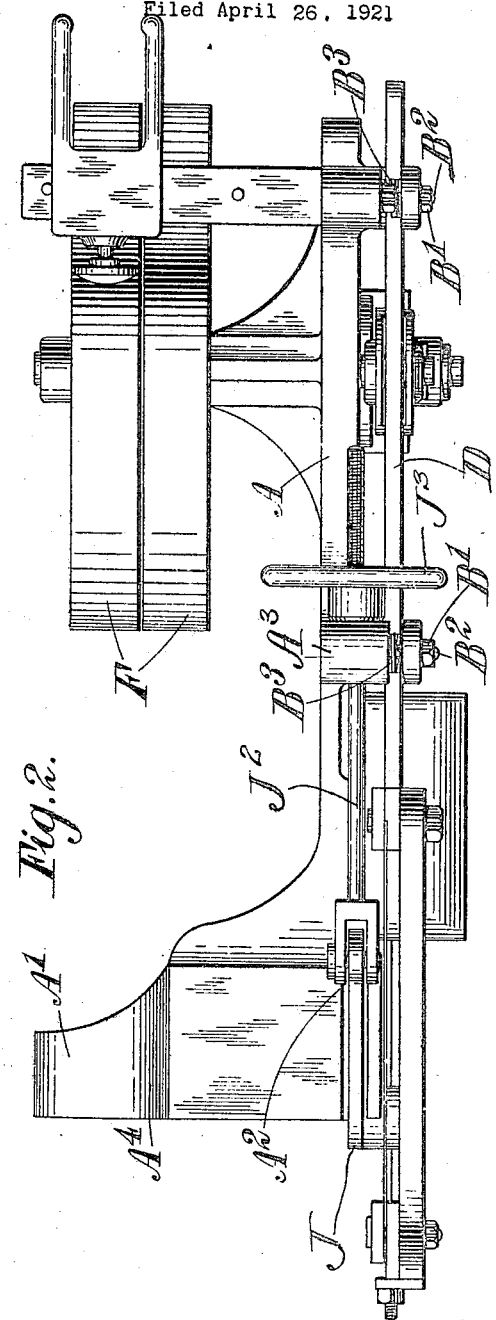

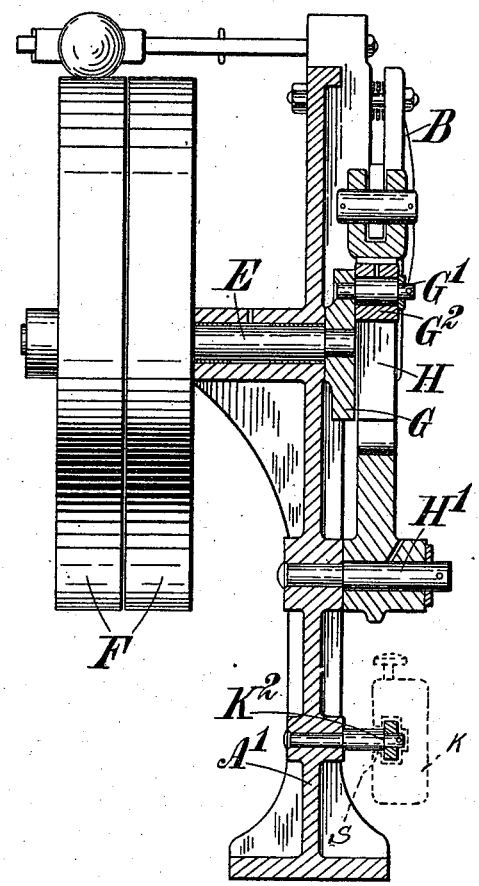

1,462,779

UNITED STATES PATENT OFFICE.

RALPH WICKSTEED, OF KETTERING, ENGLAND.

HACK-SAW MACHINE.

Application filed April 26, 1921. Serial No. 464,586.

*To all whom it may concern:*

Be it known that I, RALPH WICKSTEED, a subject of the King of England, director of Charles Wicksteed & Company Limited, residing at Kettering, Northamptonshire, England, have invented certain new and useful Improvements in Hack-Saw Machines, of which the following is a specification.

This invention relates to hack-saw machines, and has for its main object to provide a machine which shall be cheaper to manufacture than those at present in use, and yet shall be so constructed that it is easy to handle and its running parts readily kept in alignment so that it shall be efficient in its output.

It is well known that one of the difficulties with hack-saw machines, as at present manufactured, is that expensive bearings have to be provided for the saw-frame arm, in order that the saw may run true and that undue wear may not occur. It is particularly important that the saw-frame shall be prevented from lateral movement in a horizontal plane, as this results in irregular cutting and breakage of saws, yet the construction of many of the existing machines is such that, when wear occurs, it takes place in those parts which are relied upon to retain the saw-frame against lateral movement, and the effect of the wear is often magnified through the various parts, so that a slight amount of wear at one point will result in a considerable amount of lateral instability of the saw-frame.

A hack-saw machine according to this invention, is characterized by the saw-frame arm, which is flat-sided in the vertical plane, having as its only guide flat-sided members opposed to the flat sides of the arm and by the vertical depth of the bearing thus provided being considerably greater than the vertical cross-section of the arm, so that the arm can at all times be freely raised and lowered in the bearing for the purpose of allowing the saw to descend as it cuts, and also to allow the saw to be raised without any special adjustments to insert the work beneath it.

Preferably, the flat surfaces constituting the bearing for the saw-frame arm, are provided by the frame of the machine on one side of the arm and by one or more straps on the other side so mounted as to be adjustable towards and away from the frame, for example, by nuts operating against the thrust of springs.

In the accompanying drawings, which illustrate one method of carrying out this invention, Figure 1 is an elevation of the hack-saw machine, Figure 2 is a plan of the same, and Figure 3 is a section through the machine on the line 3—3 of Figure 1.

Like letters indicate like parts throughout the drawings.

The frame A is made integral with standards $A^1$, and the vertical face of the frame is faced on two parts which lie beneath straps B. The saw-frame C is so constructed that it constitutes a closed figure across which the saw $C^1$ is held under tension by the usual tightening device $C^2$. By making the saw-frame in this form a cast iron frame can be used instead of a malleable casting, as it is strong enough to resist breakage by tightening up of the nut $C^2$, whereas the open frame, if made of cast iron, is liable to break under this stress.

The saw-frame arm D whereby the saw-frame is reciprocated, lies between the flat surfaces provided by facing the frame, and the flat surfaces provided by the straps B opposed thereto; the faced parts of the frame and the strips B constitute guide members and it will be observed that the vertical depth of the bearing thus afforded by its guide members for the arm D is considerably greater than the vertical depth of the arm itself, so that the arm can freely rise and fall in the bearing. The straps B are held in place by nuts $B^1$ carried by studs $B^2$, and the said nuts operate against the thrust of springs $B^3$ placed between the frame A and the straps. It will thus be seen that the bearing can always be adjusted accurately to the arm as wear occurs by further tightening the nuts against the springs.

The driving mechanism for the saw-frame comprises a shaft E carrying fast and loose pulleys F and a disc G whereon is mounted a crank-pin $G^1$. The crank-pin is surrounded by a block $G^2$, which slides in a slotted link H. This link is vertically placed, and is pivoted at its lower end at $H^1$, to one of the standards $A^1$ of the machine, and at its upper end by a pin $H^2$ to the saw-frame arm. The saw-frame arm can thus swing about the axis of this pivot pin and is reciprocated by the thrust of the link applied through it.

The hack-saw end of the frame of the machine is slotted at $A^2$ to receive a gripping arm J. This arm is pivoted to the frame of the machine at $J^1$, and is pulled inwards by a tightening rod $J^2$ controlled by a screw-threaded hand-wheel $J^3$ which engages a screw-threaded end of the rod $J^2$ and bears against a boss $A^3$ on the frame. A table $A^4$ is provided at the side of the gripping arm so that the work can be laid thereon between the arm and a vertical face $A^5$ of the frame, with the result that when the arm is tightened against it, the work is firmly held in place beneath the saw. The space between the cutting edge of the saw and the bottom of the saw-frame, is sufficient to admit the largest bar or other piece of work which the machine is intended to accommodate, and it will be seen that the frame can at all times be lifted to insert the work without any prior adjustment. Thus if the machine is making successive cuts through a bar of metal and has completed one cut so that the saw-frame drops to the limit of movement afforded by the bearings of the arm D, it is only necessary to commence sawing another section, to first lift the saw-frame arm and then feed the work forward through the space between the cutting edge of the saw and the bottom of the frame, after releasing the tightening screw $J^3$, when the screw $J^3$ can be again tightened up and everything is ready for the next cut.

The loading of the saw is effected by a block K slidably mounted on a bar $K^1$. This bar is pivoted to one of the standards $A^1$ of the machine at $K^2$ and at the other end is pivoted at $K^3$ to the lower end of a vertical link $K^4$. The upper end of the link $K^4$ is pivoted at $K^5$ to the saw-frame, so that the weight is not reciprocated by the saw-frame, though it always retains a downward pull upon it. The rear of the bar $K^1$ is run out beyond the pivot $K^2$ and the weight can pass this pivot, being slotted for this purpose, as at S, so that, if desired, the weight can be run out on to this portion to reduce or eliminate its downward pull on the saw-frame.

It will be seen that the character of bearing for the arm D is inexpensive to produce and is such that the lateral play in a horizontal plane can at all times be made practically nil. If slight wear does occur in these bearings, the distance at which the two straps are placed apart prevents this wear from being appreciably magnified at the hack-saw end and as wear occurs it can be immediately followed up by adjusting the straps B closer to the vertical face of the frame. The bearing moreover, is inexpensive to produce as compared with V-shaped guides and other more complicated bearings, which are at present employed, and the depth of bearing makes it possible to follow the cut down as it operates, and also permits of work to be introduced without any special rotatable carriage as the one pivot pin $H^2$ permits of all the movements necessary, for these purposes. The driving mechanism, that is the crank-pin $G^1$, with its block $G^2$ and the link H is simple and inexpensive to manufacture and affords a quick return movement such as is desired for machines of this class. Again, the gripping arm J working in the slot $A^2$, constitutes inexpensive and efficient means for holding the work in place, instead of the usual expensive vice. All these parts therefore, co-operate to produce an efficient and inexpensive machine, and it is found in practice that such a machine can be operated at a greater speed than the more expensive machines now upon the market.

Obviously, details may be modified without departing from the spirit of this invention as defined in the claims.

What I claim as my invention and desire to secure by Letters Patent is:

1. In a hack saw machine, the combination of a machine frame, saw frame, a flat sided arm attached to the saw frame, flat sided guide members on said machine frame opposed to the flat sides of the arm and constituting a bearing in which said arm can reciprocate, which bearing is considerably greater in depth than the width of the arm, reciprocatory driving mechanism, and a horizontal pivot pin, about the longitudinal axis of which the said arm can swing operatively connecting the arm with said driving mechanism, said bearing and said pivot pin constituting the sole means for guiding said arm, whereby the saw frame is free to rock vertically about the pivot pin in all positions of the driving mechanism, substantially as described.

2. In a hack saw machine, the combination of a machine frame, a saw frame, a flat sided arm attached to the saw frame, said machine frame having a flat guide face opposed to one flat side of said arm, a guide member having a flat guide face opposed to the other flat side of said arm adjustably mounted on the machine frame, a spring pressing on said guide member and tending to grip its guide face against the opposed face of said arm, said guide faces constituting a bearing which is considerably greater in depth than the width of the arm, reciprocatory driving mechanism and a horizontal pivot pin, about the longitudinal axis of which the said arm can swing, operatively connecting the arm with said driving mechanism, said bearing and said pivot pin constituting the sole means for guiding said arm, whereby the saw frame is free to rock vertically about the pivot pin in all positions of the driving mechanism, substantially as described.

3. In a hack saw machine, the combination of a machine frame, saw frame, a flat sided arm attached to the saw frame, flat sided guide members on said machine frame opposed to the flat sides of the arm and constituting a bearing in which said arm can reciprocate, which bearing is considerably greater in depth than the width of the arm, reciprocatory driving mechanism comprising a slotted link pivotally mounted towards one end of it on the machine frame, a rotary driving member journalled in the machine frame and engaging said link in its slot, and a horizontal pivot pin operatively connecting said arm with the other end of said link, said bearing and said pivot pin constituting the sole means for guiding said arm, substantially as described.

4. In a hack-saw machine, the combination of a machine-frame, a saw-frame having a flat-sided arm, flat-sided guide members on said machine-frame opposed to the flat sides of the arm and constituting a bearing in which said arm can reciprocate, which bearing is considerably greater in depth than the width of the arm, driving-means arranged to reciprocate said arm in said bearing, a horizontal lever pivoted on the machine-frame below said arm, means operatively connecting said lever with said saw-frame, and a weight carried by said lever.

5. A hack-saw machine comprising in combination a machine-frame having a work-table arranged at right-angles to one side thereof, a saw-frame in the form of a closed figure having an external flat-sided arm, flat-sided guide members on said machine-frame opposed to the flat sides of the arm and constituting a bearing in which said arm can reciprocate, a saw carried in said saw-frame in positional relation to said table, a gripping-arm pivoted to said machine-frame below said table and extending above the same for gripping against said side of the machine-frame work that is supported on said table, tightening means mounted in the machine-frame and operatively connected with said gripping-arm above the table, and driving means arranged to reciprocate said arm in said bearing.

6. A hack-saw machine comprising in combination a machine-frame having a horizontal work-table arranged at right-angles to one side thereof, a saw-frame in the form of a closed figure having an external horizontal flat-sided arm guided with play in a vertical direction in two bearings spaced apart on the machine-frame; driving-mechanism comprising a slotted link pivotally mounted on the machine-frame and operatively connected to said arm, and a rotary driving-member engaging said link between said bearings in its slot; a horizontal lever pivoted on the machine-frame below said arm, a link operatively connecting said lever with said saw-frame, and a weight adjustably carried by said lever; a saw carried in said saw-frame in positional relation to said table; a gripping arm pivoted to said machine frame below said table and extending above the same for gripping against said side of the machine-frame work that is supported on said table, and tightening means mounted on the machine-frame and operatively connected with said gripping arm above the table.

In testimony whereof I affix my signature.

RALPH WICKSTEED.